(12) United States Patent
Stark

(10) Patent No.: US 12,502,737 B2
(45) Date of Patent: Dec. 23, 2025

(54) INTERNAL WELDING OF PIPES AND PROFILES

(71) Applicant: SMS GROUP GMBH, Duesseldorf (DE)

(72) Inventor: Michael Stark, Markdorf (DE)

(73) Assignee: SMS GROUP GMBH, Duesseldorf (DE)

( * ) Notice: Subject to any disclaimer, the term of this patent is extended or adjusted under 35 U.S.C. 154(b) by 959 days.

(21) Appl. No.: 17/637,160

(22) PCT Filed: Aug. 31, 2020

(86) PCT No.: PCT/EP2020/074209
§ 371 (c)(1),
(2) Date: Feb. 22, 2022

(87) PCT Pub. No.: WO2021/047932
PCT Pub. Date: Mar. 18, 2021

(65) Prior Publication Data
US 2022/0305594 A1 Sep. 29, 2022

(30) Foreign Application Priority Data

Sep. 10, 2019 (DE) .......................... 102019213691.5
Jun. 16, 2020 (DE) .......................... 102020207414.3

(51) Int. Cl.
*B23K 37/02* (2006.01)
*B23K 101/06* (2006.01)

(52) U.S. Cl.
CPC ...... *B23K 37/0276* (2013.01); *B23K 37/0211* (2013.01); *B23K 37/027* (2013.01); *B23K 2101/06* (2018.08)

(58) Field of Classification Search
CPC ............ B23K 37/0276; B23K 37/0211; B23K 37/027; B23K 2101/06; B23K 26/703;
(Continued)

(56) References Cited

U.S. PATENT DOCUMENTS

| 3,764,056 | A | 10/1973 | Edwards et al. |
| 10,040,141 | B2 | 8/2018 | Rajagopalan et al. |
| 2014/0346163 | A1* | 11/2014 | Rajagopalan ........ B23K 9/1274 219/60 A |

FOREIGN PATENT DOCUMENTS

| CN | 106705857 A | 5/2017 |
| DE | 102013219702 A1 | 4/2015 |
| WO | 2019/101889 A1 | 5/2019 |

OTHER PUBLICATIONS

International Search Report, dated Dec. 1, 2020 in corresponding International Application No. PCT/EP2020/074209.

* cited by examiner

Primary Examiner — Phuong T Nguyen
(74) Attorney, Agent, or Firm — Amster, Rothstein & Ebenstein LLP

(57) ABSTRACT

The invention relates to a device (1) for the internal welding of pipes and profiles, comprising a cantilever arm (2, 2a), which is secured to a suspension (3), which cantilever arm can be inserted into the pipe or profile to be welded and on which a welding head (4) is displaceably attached, the cantilever arm (2, 2a) further comprising at least one laser (5) and at least one camera (6). To avoid the disadvantageous effects of magnetism and heat on the position of the welding head (4), the invention proposes that a laser (5) is attached on the suspension (3), and a camera (6) for observing the laser beam (5a) is attached on the end of the cantilever arm (3) or on the welding head (4). A correction signal is calculated from the change in position of the laser beam (5a) observed with the camera (6) and forwarded to a control unit for adjusting the welding head (4) by means of displacement devices (8, 9).

10 Claims, 1 Drawing Sheet

(58) Field of Classification Search
CPC ...... B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066
USPC ..................... 219/21.63, 121.64, 136, 119
See application file for complete search history.

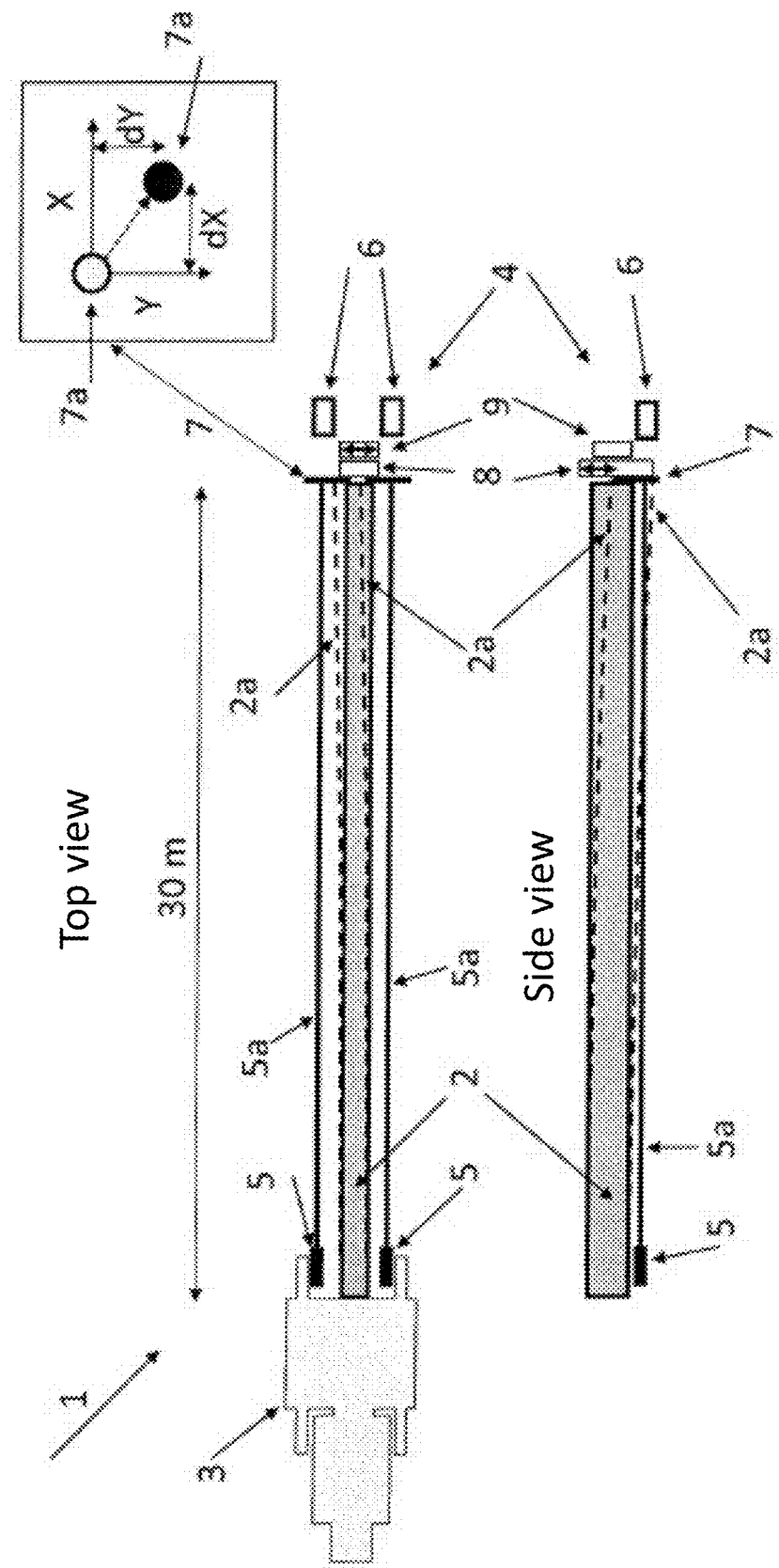

INTERNAL WELDING OF PIPES AND PROFILES

FIELD OF INVENTION

The invention relates to a device and a method for internal welding of pipes and profiles, including a cantilever arm which is attached to a suspension, can be inserted into the pipe or profile to be welded, and on which a welding head is displaceably attached, wherein the cantilever arm further includes a laser and a camera.

BACKGROUND OF RELATED ART

With internal welding, the welding head is usually located at the end of a long cantilever arm, which is inserted into the pipe or profile. The media required for welding (gases, welding current, welding cable, welding powder, welding wire, . . . ) are fed through or along the cantilever to the welding head.

Such devices and methods are known, for example from U.S. Pat. Nos. 3,764,056 and 10,040,141 B2.

U.S. Pat. No. 3,764,056 discloses a device with which pipes can be welded together from the inside of the pipe. A cantilever arm, at the tip of which a welding head is arranged, is inserted into the pipe so that the welding head is situated in the vicinity of the area to be welded, which is formed by the contact surface of the abutting pipes. The pipes rotate while the adjustable welding head creates the weld. With the help of a camera mounted near the welding head, the welding process can be observed visually and controlled remotely. The welding head can be positioned relative to the pipe during the welding process.

U.S. Pat. No. 10,040,141 describes a laser-controlled internal welding device for a pipeline. The system includes an external positioning device that allows the pipe segments to be welded to be aligned relative to one another so that they can be welded with the internal welding device. The welding device also includes a laser for monitoring the weld profile and for guiding an articulation head of the welding head. A camera for visual inspection of the weld seam after the welding process is also provided.

The use of a laser for detecting profiles is also known from CN 106705857 A. CN 106705857 A relates to the measurement of surfaces using a laser system in the field of geotechnical engineering, namely subsoil and tunnel technology. For this purpose, a laser placed on the surface to be measured is directed at a fixed plate. When the laser is moved along the surface, or when the surface shifts when the laser is fixed, the point of light generated by the laser beam on the plate changes or shifts accordingly. From the displacement of the point of light on the plate, conclusions can then be drawn about the structure of the surface.

However, the described internal welding devices have a number of fundamental problems: During the welding process, a magnetic field is created which deflects and/or rotates the cantilever arm. The extent of this deflection and/or rotation depends on how far the cantilever arm was inserted into the pipe or profile to be welded. In addition, the welding process itself and the transport of the welding media to the welding head—especially when welding "under powder"; the welding flux typically has a temperature of 120° C. and the welding cables can reach 100° C.—results in high temperatures that cause an additional change in the bending and rotation of the cantilever. Rotation is also caused, for example, by the fact that the hot welding powder is usually only transported on one side of the cantilever and that the welding cables do not all have the same temperature due to different current loads. With large cantilever lengths, even small temperature differences between left/right/up/down can cause large deflections at the cantilever end/welding head.

This three-dimensional torsion, rotation, bending or deflection of the cantilever arm caused by magnetism and the effects of heat leads to a corresponding change in the position of the welding head, which is no longer in the desired position, which adversely affects the welding process and the weld seam geometry, and thus the weld seam quality.

SUMMARY

This is where the invention seeks to provide an improvement.

This object is achieved according to the invention in that a device of the type mentioned above has a control device for moving the welding head, one or more lasers are attached to the suspension, one or more cameras are attached to the welding head, wherein one or more laser beams are respectively directed onto, and recognizable by the one or more cameras, an evaluation module is present, which can evaluate changes in the relative positions of the laser beams recognized by the one or more cameras, generate a signal from the recognized changes and feed the signal to the control device for moving the welding head.

The subject of the invention is therefore a device according to claims.

According to the invention, a pipe can also be a tubular element, also elliptical, a profile, for example, a U-shaped or a rectangular profile.

The invention also relates to a method for moving a welding head in a device according to one or more of the claims, including at least the following steps:

detecting initial values X, Y of the position of the or each laser beam with the or each camera in an initial state of the device, detecting deviations dX, dY of the position of the or each laser beam from the initial values X, Y during operation of the device, generating a signal for the control device from the detected deviations dX, dY, forwarding the signal to the control device, which moves the welding head as a function of the signal in such a way that the deviations dX, dY become smaller.

The change in the relative positions of the laser beams is due to the fact that the laser beams are attached virtually stationary to the suspension of the cantilever arm, while the cameras, which are attached to the welding head at the end of the cantilever arm, move relative to the stationary laser beams with the stretching, bending, deflection or torsion of the cantilever arm. By feeding the signal back to the control device, a closed control loop is created for tracking the welding head. The detection of the deviations, the generation of the signal and the forwarding to the control device is preferably carried out continuously, e.g., in "real time", or intermittently regularly or irregularly, preferably with the help of a process computer.

The welding head can be attached so as to be displaceable in at least two spatial directions, for example vertically and horizontally. Advantageously, it can be displaced in three spatial directions, for example additionally along or parallel to the axis of the cantilever. It is particularly advantageous when the welding head is also rotatably mounted, for example along or parallel to the axis of the cantilever arm, namely when torsion of the cantilever arm is detected. Horizontal and vertical displacements result in linear relative changes in the positions dX and dY of a laser beam, while torsional displacements produce curved deviations dX and dY, respectively.

In principle, the invention works with only one laser and only one camera. In particular, however, if rotation or torsion is also to be detected, plural lasers and plural cameras are required.

Preferably, two lasers, also referred to as laser transmitters or laser pointers, and two cameras are present. This allows better resolving horizontal and vertical displacements of the cantilever caused by torsion. Additional camera-laser pairs would further improve resolution.

The, or each camera is preferably a matrix camera. Due to the pixel-precise imaging of the laser beam, a change in the position of the laser beam can be resolved and calculated with pixel precision.

It is particularly advantageous when a projection surface, preferably a transparently colored plate, particularly preferably a transparently white-colored plate, is arranged in the beam path between the laser and the camera. On such a projection surface, the laser beam can be better recognized and tracked by the cameras as a colored dot.

Additional data or measured values from sensors, such as a height sensor on the welding head (stick-out control) or a laser seam tracking sensor (weld seam tracking) would further improve the compensation for the effects on the cantilever arm or the tracking of the welding head. Initial values of the welding head position are preferably also recorded in an initial state of the device. In the initial state, the device is "cold", i.e., it is at ambient temperature.

The invention achieves a reduction in welding errors, such as "seam alignment" or "undercut", which are caused, among other things, by imprecise or even undefined welding head positioning. In addition, influencing factors related to the operation of the device are reduced, which improves the reproducibility and quality of the weld seams. In state-of-the-art internal welding systems, the welding head position must be checked by the operating personnel in the event of deflection and twisting and, if necessary, re-referenced. The compensation system according to the invention significantly improves the reproducibility of the welding process overall, which is reflected in improved weld seam quality, weld seam geometry and a lower error frequency.

Further features and details of the invention are set forth in the patent claims and the following description of the exemplary embodiment of the invention shown in the drawing. It is shown in:

BRIEF DESCRIPTION OF THE DRAWING

FIG. 1 a schematic diagram of a possible embodiment of the device according to the invention in a plan view and a side view.

DETAILED DESCRIPTION OF THE EMBODIMENTS

In the shown device 1, a cantilever arm 2 is attached to a suspension 3. The pipe or profile to be welded is not shown because it is not necessary for understanding the invention. However, the device 1 can be imagined as being situated in the middle of a pipe or profile. A deflection of the cantilever 2, as a result of magnetism or the effects of temperature, is indicated by the dashed lines 2a in the top view in the horizontal direction and in the side view in the vertical direction of FIG. 1. At the end of the cantilever 2, a welding head 4 is mounted for movement in the vertical and horizontal directions perpendicular to the axis of the cantilever 3, wherein the welding head 4 itself is not shown. Two lasers 5 are attached to the suspension 3. The respective laser beams 5a are directed at two cameras 6 which are fastened to the end of the cantilever arm 3. In the beam path between the laser 5 and the camera 6, a plate 7, transparently colored, preferably in white, is attached, wherein a plate 7 can of course also be provided for each laser camera pair. The plate 7 serves as a projection surface for the laser beams 2a, for easy recognition of the laser beams by the cameras 6 as a point 7a and tracking of their relative positions in the horizontal X and vertical X directions. The deviations dX and dY are calculated from the different positions. Using a processor (not shown) and corresponding software, together an evaluation module, a signal is generated from the deviations and fed back to the control unit (also not shown). The control unit controls displacement devices 8 (vertical) and 9 (horizontal), which adjust the welding head 4 in such a way that the deviations dX and dY become smaller or, ideally, disappear. A laser beam point 7a can be seen in the detailed view of plate 7, which laser beam point, seen from camera 6, has deviated from a position X, Y to a position X+dX, Y+dY as a result of the deflection 2a.

In the shown example, the length of the cantilever 2 is given as 30 m. This is not to be understood as a limitation but is only intended to give an idea of the possible orders of magnitude. Of course, the lengths can be both shorter and longer. A possible torsion is not indicated in this drawing.

LIST OF REFERENCE NUMERALS 1 internal welding device
2 cantilever
2a deflection of the cantilever
3 suspension
4 welding head
5 laser
5a laser beam
6 camera
7 projection surface
8 displacement device vertical
9 displacement device horizontal

The invention claimed is:
1. A device for internal welding of pipes and profiles, comprising:
an elongated cantilever arm which is attached at a first end to a suspension and which is selectively inserted into a pipe or profile to be welded, the cantilever arm having a second end on which a welding head is movably attached;
a control device for moving the welding head;
one or more lasers fixedly attached to the suspension and distally from the welding head;
one or more cameras attached to the welding head;
wherein one or more laser beams emitted by the one or more lasers proximate the first end are respectively directed at and recognizable by the one or more cameras at the second end of the cantilever arm; and
an evaluation module, which is configured to evaluate directional changes in relative positions of the one or more laser beams with respect to movement of the second end of the cantilever arm that is detected by the one or more cameras to generate a signal from the directional changes in the relative positions of the one or more laser beams and to transmit the signal to the control device for moving the welding head to compensate for such directional changes.

2. The device according to claim 1, wherein two lasers and two cameras are attached.

3. The device according to claim 1, wherein the or each camera is a matrix camera.

4. The device according to claim 1, wherein a projection surface is arranged in a beam path between the one or more lasers and the one or more cameras.

5. The device according to claim 4, wherein the projection surface is a transparently colored plate.

6. The device according to claim 1, wherein additional sensors are present and connected to the evaluation module.

7. The device according to claim 6, wherein at least one of the additional sensors is a height sensor.

8. A method for moving the welding head in the device according to claim 1, comprising at least the steps of:

detecting initial values of a position of the or each laser beam with the or each camera in an initial state of the device, detecting deviations in the position of the or each laser beam from the initial values during operation of the device, generating a signal for the control device from the detected deviations, and forwarding the signal to the control device, which moves the welding head as a function of the signal so that that the deviations become smaller.

9. The method according to claim 8, wherein additional measured values or data from additional sensors are used to generate the signal.

10. The method according to claim 8, wherein the step of detecting initial values includes detecting initial values of the welding head position in the initial state of the device.

\* \* \* \* \*